United States Patent [19]

Streeper et al.

[11] Patent Number: 5,625,978
[45] Date of Patent: May 6, 1997

[54] COLLAPSIBLE CRAB TRAP

[75] Inventors: Leonard W. Streeper, R.R. #24, Box 69, 2 Clover La., Richland, N.J. 08350; Theodore Streeper, Jr., Vineland, N.J.

[73] Assignee: Leonard W. Streeper, Richland, N.J.

[21] Appl. No.: 586,354

[22] Filed: Jan. 16, 1996

[51] Int. Cl.⁶ .................................................. A01K 69/10
[52] U.S. Cl. .................................................. 43/105; 43/102
[58] Field of Search ........................... 43/105, 100, 102, 43/103, 104

[56] References Cited

U.S. PATENT DOCUMENTS

| | | |
|---|---|---|
| 679,327 | 7/1901 | Newcorn . |
| 1,074,276 | 9/1913 | Masek . |
| 1,193,816 | 8/1916 | Ottmann . |
| 1,383,992 | 7/1921 | Masek . |
| 1,531,300 | 7/1923 | Merle . |
| 1,968,758 | 7/1934 | Gatch ........................ 43/105 |
| 3,678,612 | 7/1972 | Hendrickson .............. 43/105 |
| 3,867,782 | 2/1975 | Ortiz ........................... 43/105 |
| 4,044,493 | 8/1977 | Fox ............................. 43/105 |
| 4,554,760 | 11/1985 | Ponzo ........................ 43/100 |
| 4,604,823 | 8/1986 | Ponzo ........................ 43/105 |
| 4,654,997 | 4/1987 | Ponzo ........................ 43/102 |
| 4,864,770 | 9/1989 | Serio .......................... 43/100 |
| 5,199,211 | 4/1993 | McKenzie ................. 43/102 |
| 5,353,541 | 10/1994 | Jonason et al. ............ 43/105 |

*Primary Examiner*—Kurt Rowan
*Assistant Examiner*—James Miner
*Attorney, Agent, or Firm*—Norman E. Lehrer; Jeffrey S. Ginsberg

[57] ABSTRACT

A crab trap is described that is movable between an erect condition and a collapsed condition. The crab trap includes top and bottom panels each with a plurality of edges. A pair of opposing side panels are pivotally and hingedly connected to a corresponding one of the edges of the bottom panel. A pair of opposing end panels are also pivotally and hingedly connected to a corresponding one of the edges of the bottom panel. Each of the panels is comprised of a mesh material. Each of the upper edges of the end panels is releasably secured against a corresponding one of the edges of the top panel. The side panels are pivotally movable between a closed position wherein the side panels extend substantially perpendicular to the top and bottom panels and an open position wherein the side panels extend substantially parallel to the top and bottom panels when the crab trap is in the erect condition. Furthermore, the end panels are substantially parallel to the top and bottom panels when the crab trap is in the collapsed condition.

5 Claims, 6 Drawing Sheets

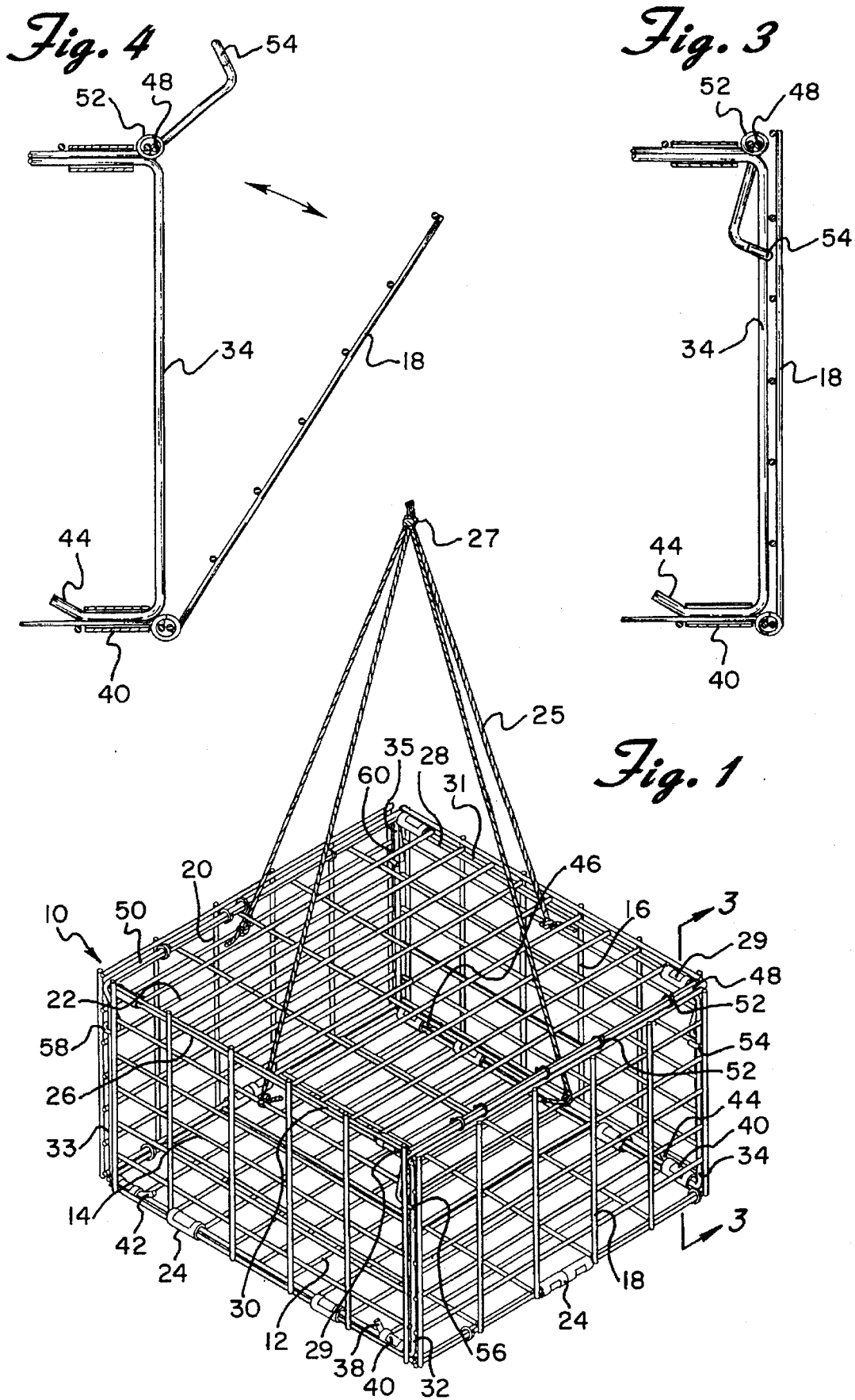

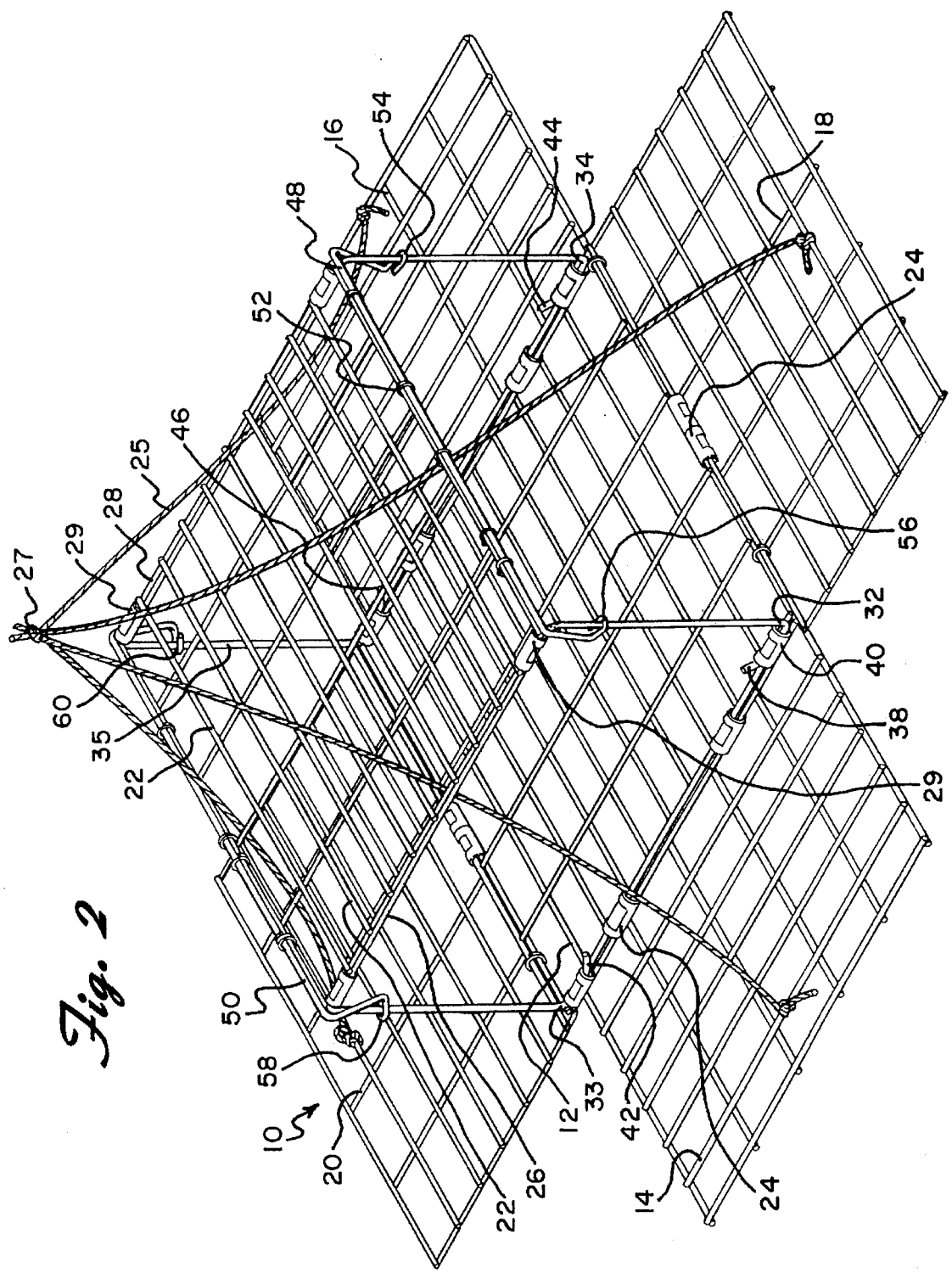

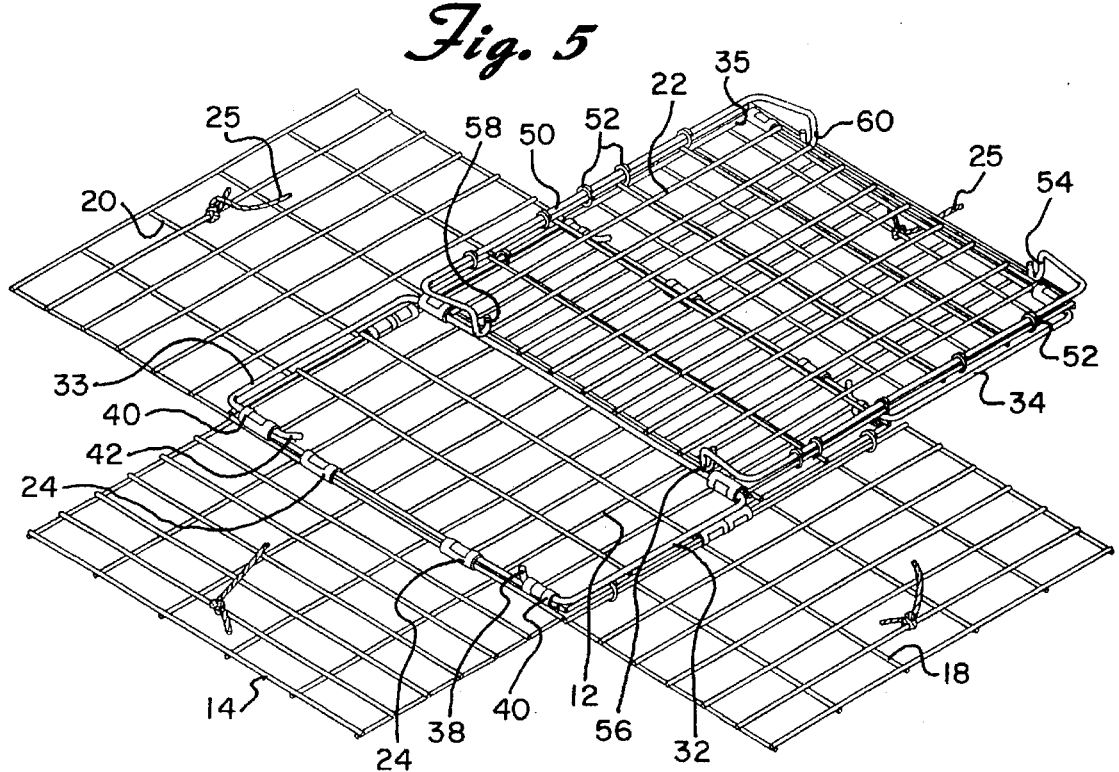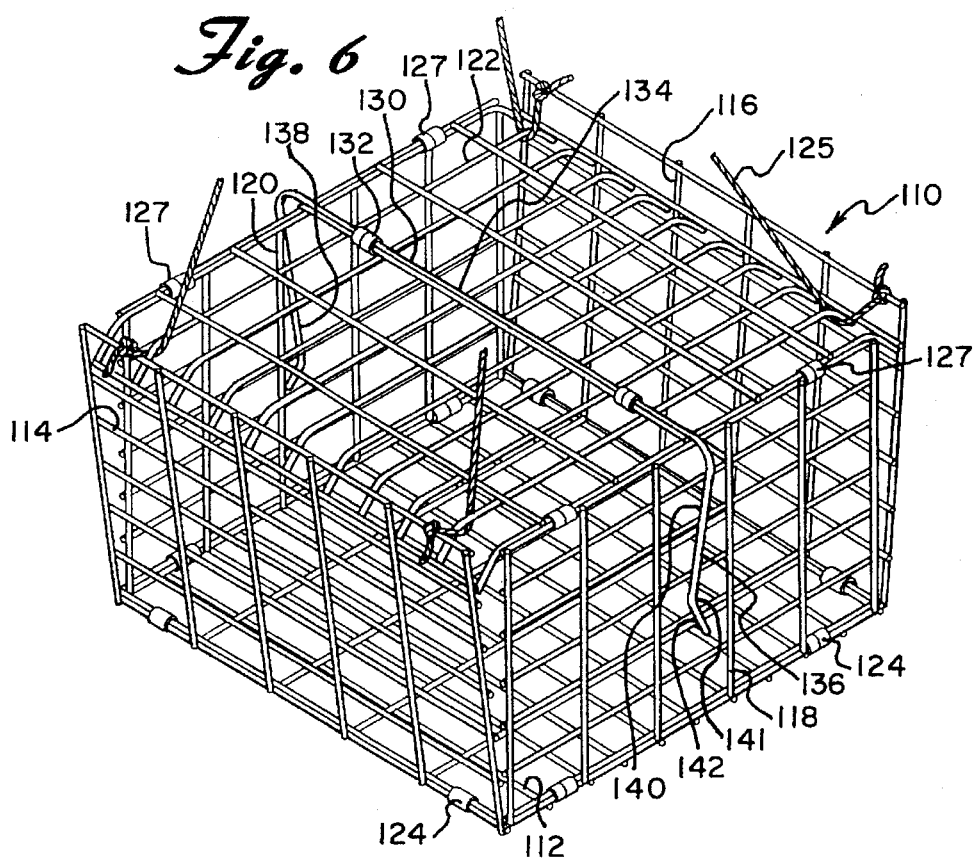

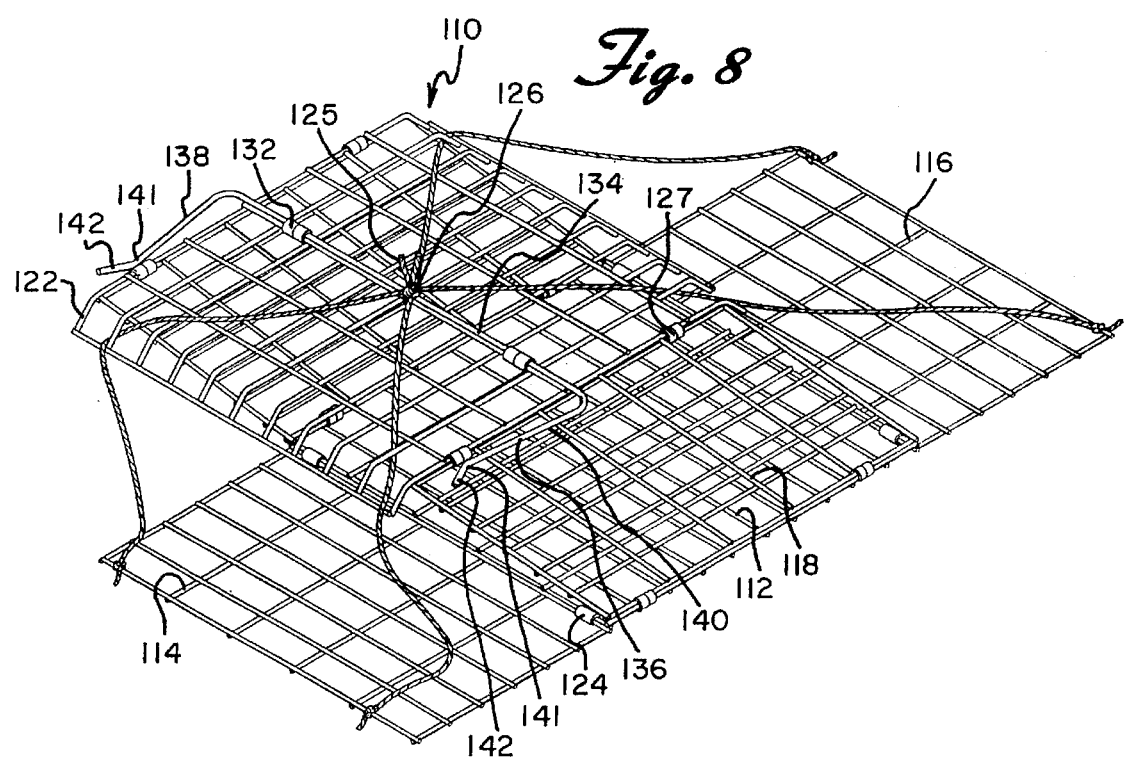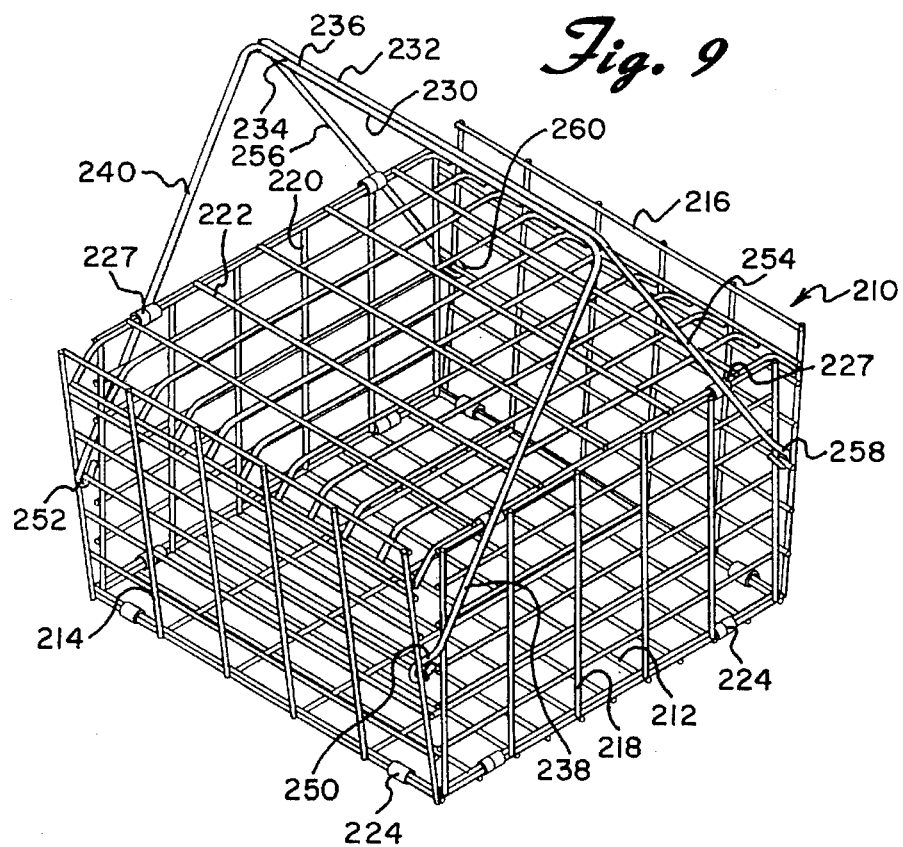

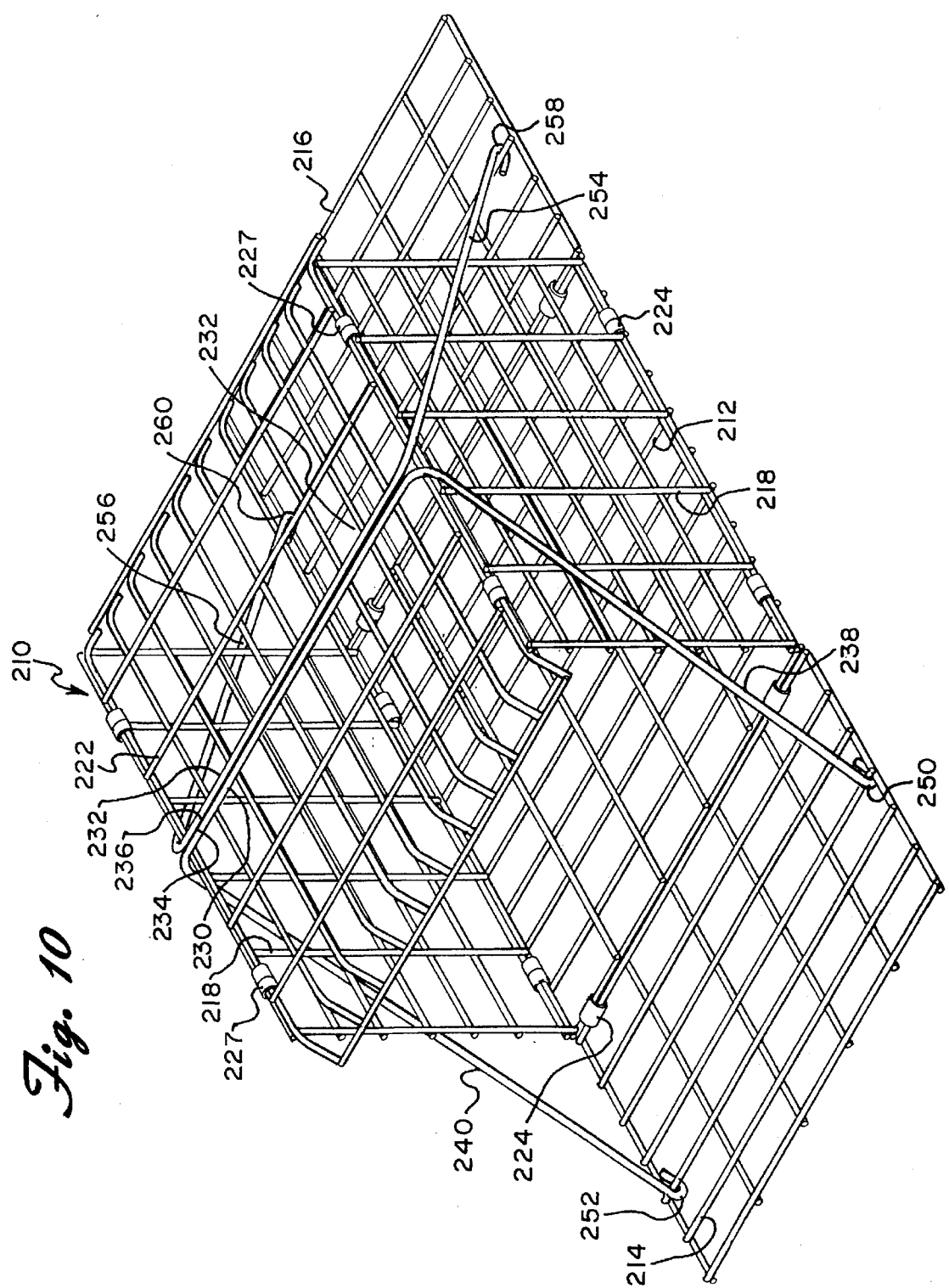

COLLAPSIBLE CRAB TRAP

BACKGROUND OF THE INVENTION

The present invention is directed toward a collapsible crab trap and, more particularly, to a preassembled trap that can be readily erected for use and easily collapsed for storage.

There are many known collapsible crab traps on the market and proposed in the prior art. A problem with many of these existing traps is that they are not effective in trapping crabs when there are relatively strong tidal currents. This is primarily due to the fact that all four panels (both opposing pairs of side and end panels) are pivoted away from the top panel when the trap is in the open condition. U.S. Pat. Nos. 679,327, 1,193,816, 1,383,992, 1,968,758, 3,867,782 show examples of such traps. Accordingly, if the water current is rapidly moving in one direction, a crab or crabs entering the trap through one end panel or side panel may be forced out an opposing panel by the force of the current.

Another problem with existing collapsible crab traps is that the top and bottom walls are not rigidly supported between one another when the trap is in its erect and open condition. Consequently, they are not very Stable when the trap is open and may collapse at an undesirable time.

Yet another drawback with many existing crab traps is that they can not easily be moved from their erect configuration to their collapsed configuration. These traps often employ a plurality of clips and/or hooks in order to maintain the trap in the erect configuration. Accordingly, when it is time to collapse the trap, the plurality of clips and hooks must be removed and are frequently lost thereby making the trap unusable unless replacement parts can be found.

SUMMARY OF THE INVENTION

The present invention is designed to overcome the deficiencies of the prior art discussed above. It is an object of the invention to provide a collapsible crab trap that is effective in trapping crabs when there are relatively strong tidal currents.

It is another object of the present invention to provide such a trap that can be readily converted between an erect condition to a collapsed condition without the use of additional parts.

It is a further object of the invention to provide a crab trap that is sufficiently stable when the side and end panels are in the open position.

In accordance with the illustrative embodiments and demonstrating features of the present invention there is provided a crab trap that is easily and quickly movable between an erect condition and a collapsed condition. The crab trap includes top and bottom panels, each with four edges. A pair of opposing side panels are pivotally and hingedly connected to a corresponding one of the edges of the bottom panel. Each of the panels is comprised of a mesh material. Each of the end panels has an upper edge that is releasably secured against a corresponding one of the edges of the top panel. The side panels are pivotally movable between a closed position wherein the side panels extend substantially perpendicular to the top and bottom panels and an open position wherein the side panels extend substantially parallel to the top and bottom panels when the crab trap is in the erect condition. Furthermore, the end panels are substantially parallel to the top and bottom panels when the crab trap is in the collapsed condition so that the same can be easily transported.

Other objects, features and advantages of the invention will be readily apparent from the following detailed description of the preferred embodiments thereof taken in conjunction with the drawings.

BRIEF DESCRIPTION OF THE DRAWINGS

For the purpose of illustrating the invention, there are shown in the accompanying drawings forms which are presently preferred; it being understood that the invention is not intended to be limited to the precise arrangements and instrumentalities shown.

FIG. 1 is a perspective view of a first embodiment of a crab trap of the present invention in the erect but closed condition;

FIG. 2 is a perspective view of the crab trap of FIG. 1 in the erect condition but showing open side and end panels;

FIG. 3 is a partial side cross-sectional view of the crab trap taken along lines 3—3 of FIG. 1;

FIG. 4 is a partial side cross-sectional view similar to FIG. 3 showing one end panel partially open;

FIG. 5 is a perspective view of the crab trap of FIG. 1 in the collapsed condition;

FIG. 6 is a perspective view of an alternate crab trap in its erect and closed condition showing a U-shaped bail securing two opposing panels in the upright position;

FIG. 8 is a perspective view of the embodiment of FIG. 6 in the collapsed condition;

FIG. 9 is a perspective view of yet another crab trap embodiment shown in its erect and closed condition, and FIG. 10 is a perspective view of the crab trap of FIG. 9 showing two opposing panels in the open position.

DETAILED DESCRIPTION OF THE PREFERRED EMBODIMENT

Figure 7:
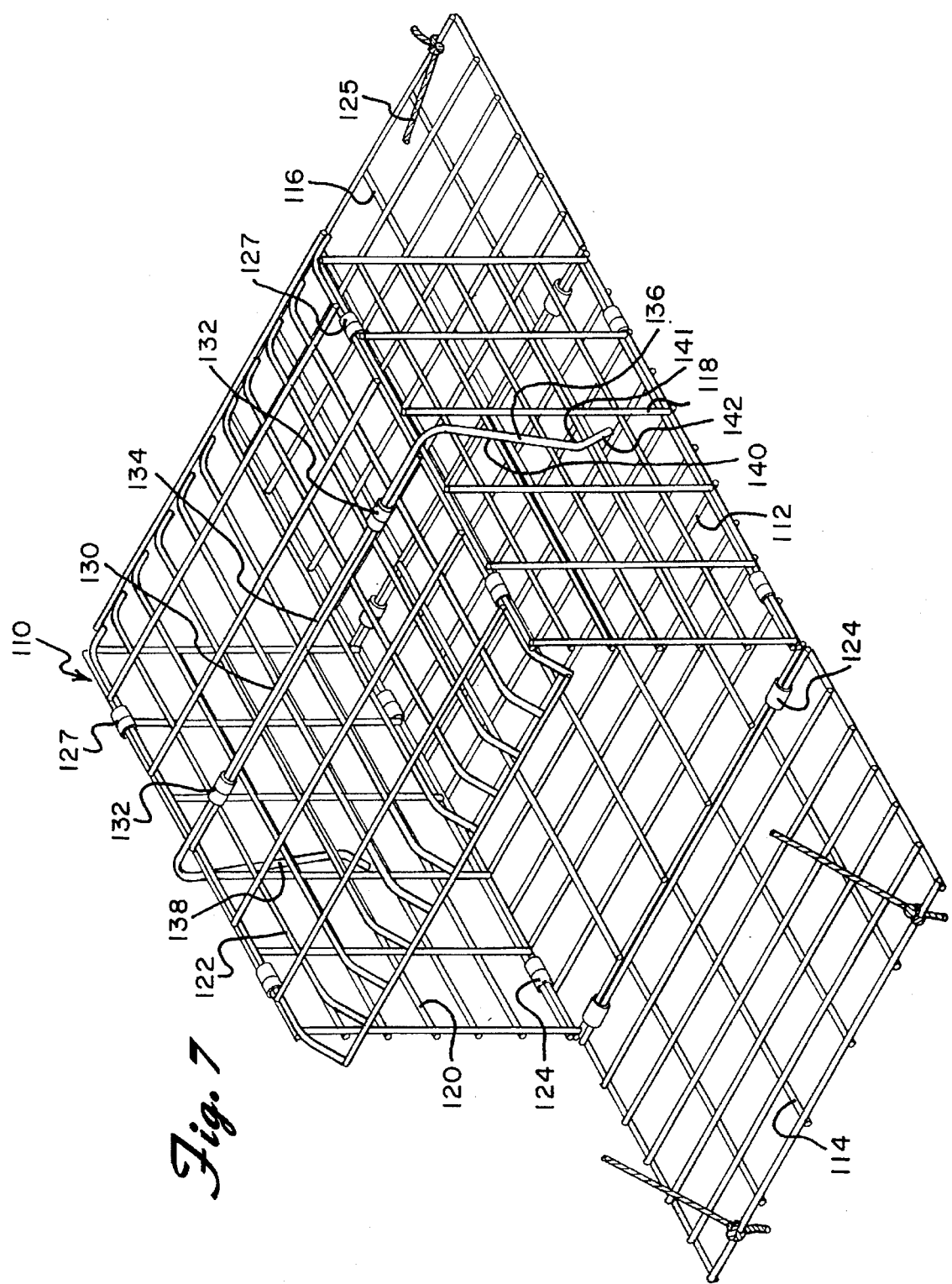
FIG. 7 is view similar to FIG. 6 showing two opposing panels in the open position.

Referring now to the drawings in detail wherein like reference numerals have been used throughout the various figures to designate like elements, there is shown in FIG. 1 a crab trap constructed in accordance with the principles of the present invention and designated generally as 10.

The crab trap 10 includes a bottom panel 12, two opposing side panels 14 and 16, two opposing end panels 18 and 20 and a top panel 22. Each of the panels is preferably made of a wire mesh material. The bottom edges of each of the side and end panels are pivotally connected to a corresponding one of the edges of the bottom panel 12 by means of a plurality of tubular hinge clips 24. Strings 25 are secured to the side and end panels adjacent the tops thereof and extend upwardly through the top panel 22. The portions of the strings that extend up through the top panel are preferably joined together in a knot 27. The strings are preferably made of nylon. However, they can be made of a variety of other materials that are not susceptible to deterioration upon prolonged exposure to salt water.

U-shaped members 26 and 28 are each pivotally secured to an opposing edge of the top panel 22 by tubular clips 29. U-shaped member 26 includes a central portion 30 and legs 32 and 34 extending from opposite ends thereof. Similarly, U-shaped member 28 includes a central portion 31 with legs 33 and 35 extending from opposite ends thereof. Each leg is substantially identical to the other legs. Accordingly, only one of the legs will be described in detail, it being understood that the description applies equally to the other legs.

Leg 32 has a foot portion 38 extending substantially perpendicularly from one end thereof. In the preferred embodiment, the foot portion 38 is pivotally secured to an edge of the bottom panel 12 by a tubular hinge clip 40. (see FIGS. 1, 3 and 4). Foot portions 42, 44 and 46 extend from legs 33, 34 and 35 and are similarly pivotally secured to the bottom panel 12 by tubular hinge clips. The securement of the foot portions of the legs to the bottom panel increases the stability of the crab trap 10 when the same is in its upright or erect condition.

Support bails 48 and 50 are pivotally secured to a corresponding edge of the top panel 22 adjacent end panels 18 and 20. Each support bail is substantially identical to the other. Accordingly, while only one support bail will be described in detail, it should be understood that the description applies equally to the other support bail. The support bail 48 is pivotally secured to an edge of the top panel by a plurality of loops 52. The support bail 48 has two hooks 54 and 56 extending downwardly from opposite ends thereof. Similarly, the support bail 50 has two hooks 58 and 60 extending downwardly from opposite ends thereof.

The hooks 54 and 56 are adapted to frictionally engage a corresponding leg 32 and 34 in order to maintain the trap 10 in its erect condition. Furthermore, the hooks 54 and 56 are preferably of sufficient size to also frictionally engage a corresponding one of the opposing side edges of end panel 18. When so engaged, the hooks prevent the end panel 18 from pivoting away from the top panel 22 when pressure is released from the strings 25 as more fully described below.

To facilitate an understanding of the principles associated with the foregoing apparatus, its operation will now be briefly described. Referring to FIG. 1, the crab trap 10 is shown in its erect condition. The trap 10 is lowered into the water by grasping strings 25. When the strings are taut, the side panels 14 and 16 and the end panels 18 and 20 are pivoted about tubular hinge clips 24 so that their top edges are each adjacent to a corresponding edge of the top panel 22.

The hooks 54 and 56 of support bail 48 are secured around a corresponding side edge of end panel 18. Further, hook 54 is secured around leg 34 and hook 56 is secured around leg 32. Hooks 58 and 60 of support bail 50 are similarly secured around a corresponding side edge of end panel 20 and around a corresponding one of the legs 33 and 35.

The crab trap 10 is now ready for use. Bait is secured to the inside bottom of the crab trap. It is then lowered into the ocean (or bay) by strings 25 until it comes to rest on the ocean floor. Thereafter, the strings 25 are released so that there is sufficient slack to allow the top edges of side panels 14 and 16 to pivot downwardly away from the top panel 22 thereby opening the same. Accordingly, crabs can readily enter the crab trap 10 and feed on the bait in the same.

It should be noted that the trap is preferably positioned so that the open side panels 14 and 16 extend in a direction perpendicular to the direction of the current. Accordingly, a crab that enters the trap will be forced against one of the closed end panels 18 or 20 rather than entering one open side panel and being carried out of the opposing open side panel by the force of the current.

After one or more crabs have entered the trap, the strings 25 are raised so as to pivot the side panels 14 and 16 about the bottom panel 12 until the side panels are adjacent the top panel 22. This effectively closes the trap in order to prevent the accidental removal of the crabs from the same. The strings are further pulled upwardly until the trap is removed from the water. Thereafter, the crabs are removed from the trap by releasing the tension on the strings 25 so that the side panels 14 and 16 once again are opened. The crabs can then be taken out of the trap.

Once the crabbing has been concluded, the crab trap 10 is moved from its erect condition, as shown in FIG. 2, to its collapsed condition, as shown in FIG. 5. This is accomplished by first disengaging hooks 54, 56, 58 and 60 from the corresponding side edges of end panels 18 and 20 by pivoting support bails 48 and 50 upwardly as shown in FIG. 4. Thereafter, end panels 18 and 20 are free to pivot about the bottom 12 so that they lie in the same plane as the side panels 14 and 16. With the hooks disengaged, the foot portions 38, 42 and 44, 46 of legs 32, 33, 34 and 35, respectively, are free to rotate so that the top panel 22 can be collapsed as shown in FIG. 5. In order to fold the trap to a more compact condition, end panels 18 and 20 can be rotated under the bottom panel 12. Once in the collapsed configuration, the trap is substantially flat so that it can be easily transported and stored.

Referring to FIG. 3, it should be noted that the hooks 54, 56, and 58, 60 can be secured around only the legs 34, 32 and 33, 35 instead of being secured around the legs and the edges of the end panels 18 and 20. In such a configuration, all four panels 14, 16, 18 and 20 would be free to pivot about the bottom panel 12 when tension is removed from the strings 25. Accordingly, all four panels would be free to move downwardly away from the top panel 22 thereby allowing crabs to enter the trap from all four directions. Since the hooks are still secured around the legs, the trap is maintained in its erect condition.

Referring to FIGS. 6–8, an alternate crab trap 110 is shown. The crab trap 110 includes a bottom panel 112, two opposing side panels 114 and 116, two opposing end panels 118 and 120 and a top panel 122. Each of the panels is preferably made of a wire mesh material. The bottom edges of each of the side and end panels are pivotally connected to a corresponding one of the edges of the bottom panel 112 by means of a plurality of tubular hinge clips 124. Strings 125 are secured to the side panels adjacent the tops thereof and extend upwardly through the top panel 122. The portions of the strings that extend up through the top panel are preferably joined together in a knot 126.

The upper edges of the end panels 118 and 120 are pivotally secured to a corresponding edge of the top panel 112 by tubular hinge clips 127. A U-shaped bail 130 is swingably secured to the central portion of the top panel 112 by means of clips 132. The U-shaped bail has an elongated central portion 134 and a pair of downwardly extending legs 136 and 138. The legs 136 and 138 are substantially identical to each other. Accordingly, only one leg will be described in detail, it being understood that the description applies to the other leg.

The leg 136 has an upper portion 140 that extends downwardly and inwardly toward the end panel 118. Adjacent the bottom of the leg 136 it is bent outwardly to form an elbow 141 and the leg 136 continues on and terminates in lower leg portion 142. The distance between elbow 141 and the corresponding elbow formed on the 138 is slightly less than the distance between the end panels 118 and 120 when the trap is in its erect condition. As a result, and as shown most clearly in FIGS. 6 and 7, the elbow 141 engages the end panel 118 to help maintain the structural rigidity of the erected trap. This also helps to prevent the bail 130 from being accidentally moved upwardly which would permit the trap to collapse.

To facilitate an understanding of the principles associated with this embodiment, its operation will now be briefly described. Referring to FIG. 6, the crab trap 110 is shown in its erect condition. The legs 136 and 138 are swung downwardly and are positioned so that they are adjacent a corresponding one of the end panels 118 and 120. This prevents the trap from collapsing and also provides the same with increased stability. Bait is secured to the inside bottom 112 of the trap. Thereafter, the trap 110 is lowered into the water by grasping string 125. When the string is taut, the side panels 14 and 16 are pivoted about tubular hinge clips 124 so that their top edges are each adjacent to a corresponding edge of the top panel 122. The trap is, therefore, in its erect but closed condition.

Once the trap is lowered to the bed beneath the water, the string 125 is released so that there is sufficient slack to allow the top edges of side panels 114 and 116 to pivot away from the top panel 122 thereby opening the same (see FIG. 7). Accordingly, crabs can readily enter the crab trap 110 and feed on the bait in the same. Once one or more crabs have entered the trap, the string 125 is raised so as to pivot the side panels 114 and 116 about the bottom panel 112 until the side panels are adjacent the top panel 122 thereby closing the trap. The string is pulled upwardly until the trap is removed from the water.

Thereafter, the crabs are removed from the trap by again releasing the tension on the string 125 so that the side panels 114 and 116 are again opened. The crabs are thereafter removed from the trap. After the crabbing has been concluded, the crab trap 110 is moved from its erect condition, as shown in FIG. 7, to its collapsed condition, as shown in FIG. 8. This is accomplished by first pivoting the bail 130 so that the legs 136 and 138 are no longer positioned against the end panels 118 and 120. The end panels 118 and 120 are then free to pivot about the bottom 112 so that they lie in substantially the same plane as the side panels 114 and 116. Since the end panels are secured to the top panel 122, the latter is similarly collapsed. In order to fold the trap to a more compact condition, the end panels 118 and 120 can be rotated under the bottom panel 112.

Referring to FIGS. 9–10, another alternate crab trap 210 is shown. Once again, the crab trap 210 includes a bottom panel 212, two opposing side panels 214 and 216, two opposing end panels 218 and 220 and a top panel 222. Each of the panels is preferably made of a wire mesh material. The bottom edges of each of the side and end panels are pivotally connected to a corresponding one of the edges of the bottom panel 212 by means of a plurality of tubular hinge clips 224.

The top edges of the end panels 218 and 220 are pivotally secured to a corresponding edge of the top panel 222 by tubular hinge clips 227. Handle members 230 and 232 are each swingably secured to a corresponding side panel 214 and 216 in the manner described below. Handle members 230 and 232 each have an elongated central portion 234 and 236, respectively. Extending from opposite ends of the central portion 234 are legs 238 and 240. Extending from the legs 246 and 248 are hooks 250 and 252 which are adapted to pivotally engage one of the rods forming the side panel 214. Similarly, legs 254 and 256 extend from opposite ends of the central portion 236. The legs 254 and 256 have hooks 258 and 260 extending therefrom which are adapted to pivotally engage one of the rods forming the side panel 216.

In the preferred embodiment, strings (not shown) are secured to the central portions 234 and 236 of the handle members 230 and 232, respectively. When the crab trap is being lowered into the water, the strings are grasped. This causes the side panels 214 and 216 to be positioned adjacent a corresponding one of the edges of the top panel 222. After the trap 210 is set in position, pressure is taken off the strings so that the side panels 214 and 216 can swing away from the top panel thereby opening the crab trap 210. The legs 238, 240 and 254, 256 are located against end panels 218 and 220 so as to maintain the trap 210 in the upright condition.

It should be noted that the crab trap 210 can be collapsed by moving the central portions 234 and 236 away from one another so that the legs 238, 240 and 254, 256 are no longer positioned against the end panels 218 and 220. Thereafter, the end panels are pivoted about the bottom panel 212 so that they can be collapsed and lie in substantially the same plane as the side panels 214 and 216.

The present invention may be embodied in other specific forms without departing from the spirit or essential attributes thereof and accordingly reference should be made to the appended claims rather than to the foregoing specification as indicating the scope of the invention.

What is claimed is:

1. A crab trap movable between an erect condition and a collapsed condition comprising:

a top panel having a pair of opposing side edges and a pair of opposing end edges, each of said side edges being perpendicular to each of said end edges of said upper panel;

a bottom panel having a pair of opposing side edges and a pair of opposing end edges, each of said side edges being perpendicular to each of said end edges of said bottom panel;

a pair of opposing side panels having upper, lower and side edges, each of said lower edges of said side panels being pivotally and hingedly connected to a corresponding one of said side edges of said bottom panel;

a pair of opposing end panels having upper, lower and side edges, each of said lower edges of said end panels being pivotally and hingedly connected to a corresponding one of said end edges of said bottom panel;

each of said panels being comprised of a mesh material;

said side panels being pivotally movable between a closed position wherein said side panels extend substantially perpendicular to said top and bottom panels and an open position wherein said side panels extend substantially parallel to said top and bottom panels when said crab trap is in said erect condition;

said side and end panels extending substantially parallel to said top and bottom panels when said crab trap is in the collapsed condition, and pivot means secured to said crab trap, said pivot means being movable between a first position wherein said crab trap can be moved into its collapsed condition and a second position wherein said crab trap is in its erect condition and wherein said top and bottom panels are in a spaced apart relation with respect to each other, said pivot means including a support bail and a U-shaped member, said support bail being pivotally secured to one of said end edges of said top panel, said U-shaped member being secured to one of said side edges of said top panel and having at least one leg extending downwardly therefrom, said support bail including hook means to frictionally engage said leg of said U-shaped member.

2. The crab trap of claim 1 further including at least two strings, a different string being connected to a corresponding one of said side panels and extending through said top panel so that when an upward force is applied to the strings said side panels pivot about said bottom panel and are each positioned against a corresponding one of said edges of said top panel.

3. A crab trap movable between an erect condition and a collapsed condition comprising:

a top panel having a pair of opposing side edges and a pair of opposing end edges, each of said side edges being perpendicular to each of said end edges of said upper panel;

a bottom panel having a pair of opposing side edges and a pair of opposing end edges, each of said side edges being perpendicular to each of said end edges of said bottom panel;

a pair of opposing side panels having upper, lower and side edges, each of said lower edges of said side panels being pivotally and hingedly connected to a corresponding one of said side edges of said bottom panel;

a pair of opposing end panels having upper, lower and side edges, each of said lower edges of said end panels being pivotally and hingedly connected to a corresponding one of said end edges of said bottom panel;

each of said panels being comprised of a mesh material;

said side panels being pivotally movable between a closed position wherein said side panels extend substantially perpendicular to said top and bottom panels and an open position wherein said side panels extend substantially parallel to said top and bottom panels when said crab trap is in said erect condition;

said side and end panels extending substantially parallel to said top and bottom panels when said crab trap is in the collapsed condition, and pivot means secured to said crab trap, said pivot means being movable between a first position wherein said crab trap can be moved into its collapsed condition and a second position wherein said crab trap is in its erect condition and wherein said top and bottom panels are in a spaced apart relation with respect to each other, said pivot means including a support bail swingably secured to said top panel, said support bail having a central portion and a pair of legs extending downwardly from opposite ends thereof, each of said legs being positioned against the outside of a different one of said end panels in order to prevent the same from pivoting about said top and bottom panels when said crab trap is in said erect condition.

4. The crab trap of claim 3 wherein said upper edges of each of said end panels are pivotally secured to a corresponding one of said end edges of said top panel.

5. A crab trap movable between an erect condition and a collapsed condition comprising:

a top panel having a pair of opposing side edges and a pair of opposing end edges, each of said side edges being perpendicular to each of said end edges of said upper panel;

a bottom panel having a pair of opposing side edges and a pair of opposing end edges, each of said side edges being perpendicular to each of said end edges of said bottom panel;

a pair of opposing side panels having upper, lower and side edges, each of said lower edges of said side panels being pivotally and hingedly connected to a corresponding one of said side edges of said bottom panel;

a pair of opposing end panels having upper, lower and side edges, each of said lower edges of said end panels being pivotally and hingedly connected to a corresponding one of said end edges of said bottom panel;

each of said panels being comprised of a mesh material;

said side panels being pivotally movable between a closed position wherein said side panels extend substantially perpendicular to said top and bottom panels and an open position wherein said side panels extend substantially parallel to said top and bottom panels when said crab trap is in said erect condition;

said side and end panels extending substantially parallel to said top and bottom panels when said crab trap is in the collapsed condition, and pivot means secured to said crab trap, said pivot means being movable between a first position wherein said crab trap can be moved into its collapsed condition and a second position wherein said crab trap is in its erect condition and wherein said top and bottom panels are in a spaced apart relation with respect to each other, said pivot means including a pair of U-shaped handle members, each of said handle members having a central portion and a pair of legs extending from opposite ends thereof, each pair of legs being pivotally secured to a different one of said side panels and being adapted to engage opposing end panels in order to prevent the same from pivoting about said top and bottom panels when said crab trap is in said erect condition.

* * * * *